(12) United States Patent
Hu et al.

(10) Patent No.: US 11,747,711 B2
(45) Date of Patent: Sep. 5, 2023

(54) OPTICAL SYSTEM

(71) Applicant: TDK TAIWAN CORP., Taoyuan (TW)

(72) Inventors: Chao-Chang Hu, Taoyuan (TW);
Che-Wei Chang, Taoyuan (TW);
Sung-Mao Tsai, Taoyuan (TW);
Yi-Cheng Hsiao, Taoyuan (TW);
Che-Hsiang Chiu, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 748 days.

(21) Appl. No.: 16/728,641

(22) Filed: Dec. 27, 2019

(65) Prior Publication Data
US 2020/0209514 A1 Jul. 2, 2020

Related U.S. Application Data

(60) Provisional application No. 62/785,593, filed on Dec. 27, 2018.

(30) Foreign Application Priority Data

Dec. 20, 2019 (EP) .................................... 19218902

(51) Int. Cl.
*G03B 3/10* (2021.01)
*G02B 7/09* (2021.01)
(Continued)

(52) U.S. Cl.
CPC ................. *G03B 3/10* (2013.01); *G02B 3/12* (2013.01); *G02B 7/023* (2013.01); *G02B 7/1828* (2013.01); *G02B 26/004* (2013.01); *G02B 27/646* (2013.01); *G03B 5/00* (2013.01); *G03B 5/02* (2013.01); *G03B 13/36* (2013.01); *H04N 23/57* (2023.01); *H04N 23/687* (2023.01); *H04N 23/6812* (2023.01); *G02B 7/09* (2013.01); *G03B 2205/0007* (2013.01); *G03B 2205/0015* (2013.01); *G03B 2205/0069* (2013.01)

(58) Field of Classification Search
CPC ............. G03B 3/10; G03B 2205/0069; G03B 2204/0015; G03B 5/02; G03B 2005/0015; G02B 7/09
USPC ...................................................... 396/75, 87
See application file for complete search history.

(56) References Cited

U.S. PATENT DOCUMENTS

| | | | | |
|---|---|---|---|---|
| 5,860,030 A | * | 1/1999 | Tada | ............... G03B 17/04 396/75 |
| 7,702,233 B2 | * | 4/2010 | Oh | ............... H04N 5/23212 396/75 |

(Continued)

FOREIGN PATENT DOCUMENTS

EP  3499286 A1 *  6/2019  ......... G02B 13/0065

*Primary Examiner* — Christopher E Mahoney
(74) *Attorney, Agent, or Firm* — Muncy, Geissler, Olds & Lowe, P.C.

(57) ABSTRACT

An optical system is provided and it includes a first optical module and a second optical module. The first optical module includes a first connecting member for connecting a first optical element. The second optical module includes a second connecting member for connecting a second optical element. The first optical module and the second optical module are arranged in a first direction.

21 Claims, 8 Drawing Sheets

(51) Int. Cl.

| | |
|---|---|
| *G02B 27/64* | (2006.01) |
| *G03B 5/00* | (2021.01) |
| *G03B 13/36* | (2021.01) |
| *G02B 3/12* | (2006.01) |
| *G02B 26/00* | (2006.01) |
| *G02B 7/182* | (2021.01) |
| *G02B 7/02* | (2021.01) |
| *G03B 5/02* | (2021.01) |
| *H04N 23/57* | (2023.01) |
| *H04N 23/68* | (2023.01) |

(56) References Cited

U.S. PATENT DOCUMENTS

| | | | |
|---|---|---|---|
| 8,159,746 B2* | 4/2012 | Suzuki | G02B 27/646 |
| | | | 359/557 |
| 2013/0300922 A1* | 11/2013 | Okano | G03B 3/10 |
| | | | 348/373 |
| 2018/0335603 A1* | 11/2018 | Hu | H02K 41/0356 |
| 2020/0195823 A1* | 6/2020 | Furutake | G03B 17/04 |

* cited by examiner

OPTICAL SYSTEM

CROSS REFERENCE TO RELATED APPLICATIONS

This application claims the benefit of U.S. Provisional Application No. 62/785,593, filed Dec. 27, 2018, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having multiple optical modules.

Description of the Related Art

As technology has developed, many of today's electronic devices (such as smartphones) have a camera or video functionality. Using the camera modules disposed on electronic devices, users can operate their electronic devices to capture photographs and record videos.

The design trend of today's electronic devices is toward miniaturization, meaning that the various components of a camera module or its structure must also be continuously reduced, so as to achieve the purpose of miniaturization. In addition, some camera modules adopt liquid lenses, and a driving mechanism of the camera module is used to change the shape of the liquid lens to achieve the function of optical zoom, so as to take the required photos or videos. However, although the existing camera module can achieve the aforementioned functions of photographing or video recording, they still cannot meet all the needs of miniaturization.

Therefore, how to design a camera module that can perform autofocus or optical image stabilization, and miniaturization at the same time is a topic nowadays that needs to be discussed and solved.

BRIEF SUMMARY OF THE DISCLOSURE

Accordingly, one objective of the present disclosure is to provide an optical system (a camera module) to solve the above problems.

According to some embodiments of the disclosure, an optical system is provided and it includes a first optical module and a second optical module. The first optical module includes a first connecting member for connecting a first optical element. The second optical module includes a second connecting member for connecting a second optical element. The first optical module and the second optical module are arranged in a first direction.

According to some embodiments, the first optical module further includes a first driving assembly and a first fixed portion, the first driving assembly is configured to drive the first connecting member to move relative to the first fixed portion, and when viewed in a second direction perpendicular to the first direction, the first driving assembly partially overlaps at least one portion of the second optical element.

According to some embodiments, the optical system further includes a third optical module, and the second optical module further includes a second driving assembly configured to drive the second connecting member to move relative to a second fixed portion of the second optical module, wherein when viewed in the first direction, the second driving assembly partially overlaps at least one portion of a third optical element of the third optical module.

According to some embodiments, the third optical module further includes a third driving assembly, a third fixed portion and a third connecting member, the third connecting member is connected to the third optical element, and the third driving assembly is configured to drive the third connecting member to move relative to the third fixed portion, wherein when viewed in the second direction, the third driving assembly partially overlaps the second optical element.

According to some embodiments, the first optical element and the third optical element are located on opposite sides of the second driving assembly.

According to some embodiments, the optical system further includes a fourth optical module, the fourth optical module includes a reflecting mirror, and the first optical module is disposed between the fourth optical module and the second optical module.

According to some embodiments, the first to the fourth optical modules are not stacked in a third direction, and the third direction is perpendicular to the first direction and the second direction.

According to some embodiments, the optical system further includes a fifth optical module, configured to receive an incident light in a third direction, the incident light is received by the fourth optical module after passing through the fifth optical module, the fourth optical module reflects a reflected light, and the reflected light moves in the first direction.

According to some embodiments, the optical system further includes a photosensitive module and a sixth optical module, and the sixth optical module is disposed between the photosensitive module and the second optical module.

According to some embodiments, the first optical module has a first housing, the second optical module has a second housing, the first housing has a first wall surface, the second housing has a second wall surface, and the first wall surface faces the second wall surface.

According to some embodiments, there is a gap formed between the first wall surface and the second wall surface.

According to some embodiments, the optical system further includes a fixed member, and the first optical module and the second optical module are fixed on the fixed member.

According to some embodiments, a gap is formed between the fixed member and the first optical module, and another gap is formed between the fixed member and the second optical module.

According to some embodiments, the optical system further includes two adhesive members for filling the gaps.

According to some embodiments, the first optical module has a first optical axis, the second optical element has a second optical axis, and the first optical module and the second optical module are configured to be adjusted so that the first optical axis is aligned to the second optical axis before the adhesive member is solidified.

According to some embodiments, the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member.

According to some embodiments, the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction.

According to some embodiments, a spacer element is disposed between the reference magnetic elements, and when viewed in the first direction, the reference magnetic elements partially overlap the spacer element, and the spacer element has a non-magnetic permeability material.

According to some embodiments, the first optical module further includes a plurality of adhesive members disposed between the spacer element and the reference magnetic elements.

According to some embodiments, the first driving assembly further includes a driving magnetic element and a driving coil, a plurality of grooves are located around the driving coil, and an adhesive member is accommodated in each of the grooves.

An optical system is provided in the present disclosure and includes a plurality of modules, which are disposed in the housing and can be fixed on the fixed member. These modules can include the liquid lens module, the reflective optical module, the aperture, or the photosensitive module. The configuration of these modules on the fixed member can be adjusted according to different design requirements so as to achieve better performance of the optical system.

In addition, the first optical to the fourth optical modules in these modules are not stacked along the Z-axis, so that the optical system of the present disclosure can achieve the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
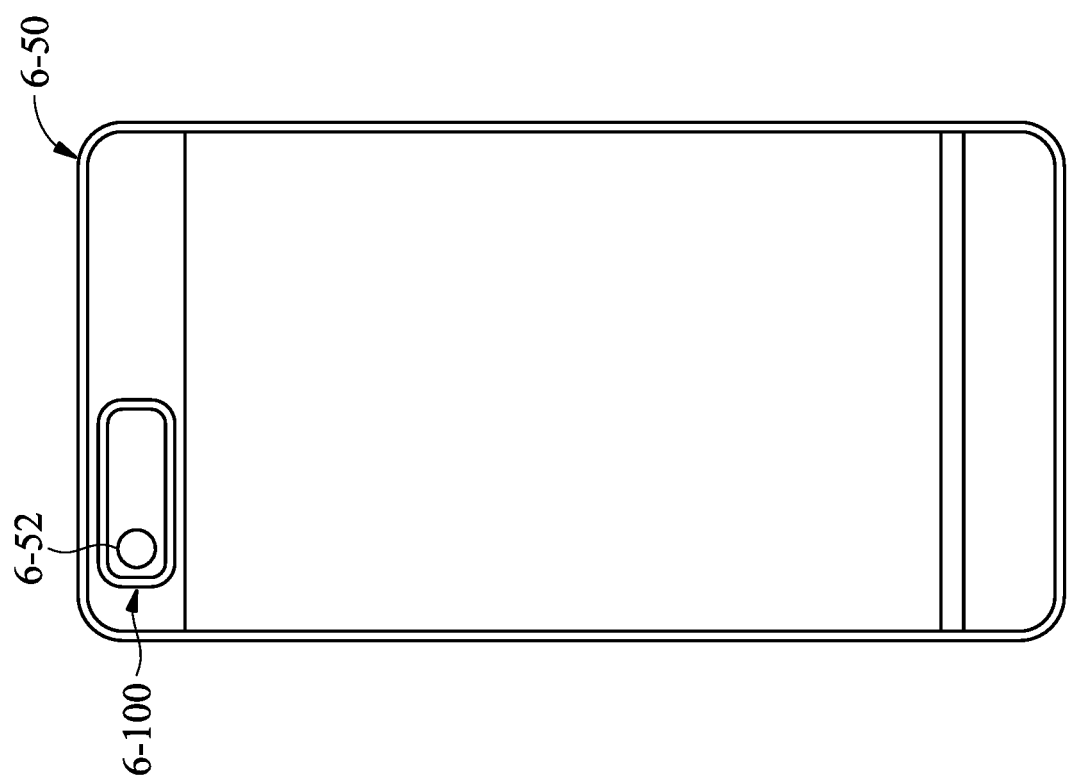
FIG. 1 shows a schematic diagram of an optical system 6-100 installed on a portable electronic device 6-50 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which shows a schematic diagram of an optical system 6-100 installed on a portable electronic device 6-50 according to an embodiment of the present disclosure. The portable electronic device 6-50 can be any kind of portable electronic devices or handheld device, such as a personal digital assistant (PDA), a smartphone, a tablet, a mobile phone, a mobile Internet device (MID), a notebook computer, a car computer, a digital camera, a digital media player, a gaming device or any other type of mobile computing device. However, it will be understood by a person skilled in the art that the present disclosure is not limited to those devices. In this embodiment, the optical system 6-100 can be a camera system with a long focal length and can provide a better image effect of a photo for a user. Light is emitted into the optical system 6-100 through an opening 6-52, so as to generate one or several digital images.

Figure 2:
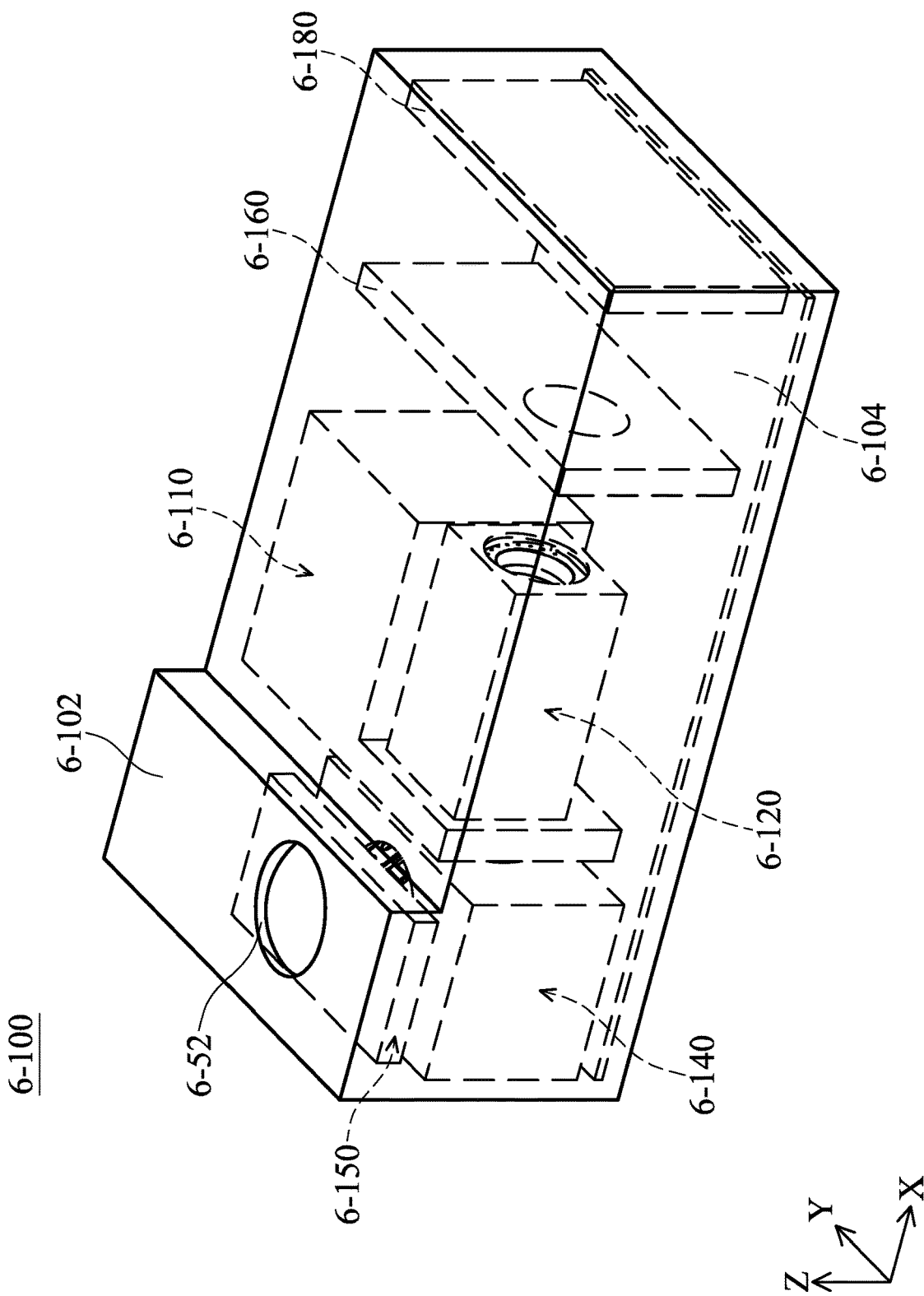
FIG. 2 is a schematic diagram of the optical system 6-100 according to an embodiment of the present disclosure.
Figure 3:
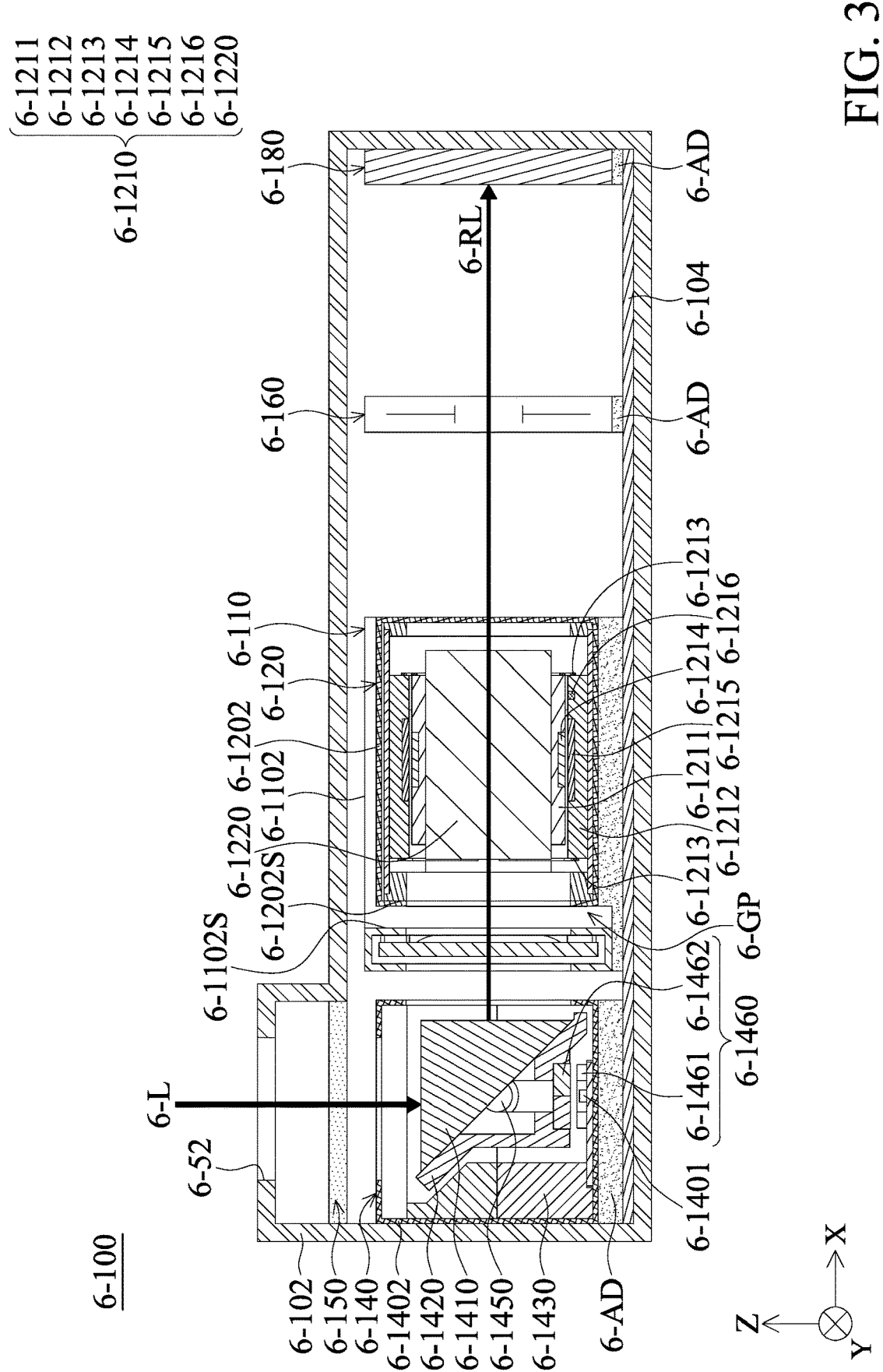
FIG. 3 is a schematic cross-sectional diagram of the optical system 6-100 according to an embodiment of the present disclosure.

Please refer to FIG. 2 and FIG. 3. FIG. 2 is a schematic diagram of the optical system 6-100 according to an embodiment of the present disclosure, and FIG. 3 is a schematic cross-sectional diagram of the optical system 6-100 according to an embodiment of the present disclosure. In this embodiment, the optical system 6-100 includes a housing 6-102, which is buried in the portable electronic device 6-50, and the optical system 6-100 further includes a fixed member 6-104, a first optical module 6-110, a second optical module 6-120, a reflective optical module 6-140 (the fourth optical module), and a photosensitive module 6-180 which are disposed in a housing 6-102 Inside.

the fixed member 6-104 may have a plate-shaped structure, which is fixed to the bottom surface of the housing 6-102, and the first optical module 6-110, the second optical module 6-120, the reflective optical module 6-140 and the photosensitive module 6-180 are fixedly disposed on the fixed member 6-104 and are arranged in a first direction (the X-axis). In the first direction, the first optical module 6-110 is disposed between the reflective optical module 6-140 (the fourth optical module) and the second optical module 6-120.

It should be noted that there may be a gap between each of the optical modules (may including the photosensitive module 6-180) and the fixed member 6-104. For example, as shown in FIG. 3, a gap is formed between the fixed member 6-104 and the first optical module 6-110, and another gap is formed between the fixed member 6-104 and the second optical module 6-120. The optical system 6-100 may include a plurality of adhesive members 6-AD, filling these gaps, so that the optical modules can be fixed to the fixing member 104.

Furthermore, the first optical module 6-110 has a first housing 6-1102, the second optical module 6-120 has a second housing 6-1202, and the first housing 6-1102 has a first wall surface 6-1102S, the second housing 1202 has a second wall surface 6-1202S, and the first wall surface 6-1102S faces the second wall surface 6-1202S. In this embodiment, the first wall surface 6-1102S does not contact the second wall surface 6-1202S, which means that there is a gap 6-GP formed between the first wall surface 6-1102S and the second wall surface 6-1202S.

Similarly, there is also a gap between a housing 6-1402 of the reflective optical module 6-140 and the first housing 6-1102, and so on. That is, each module in the optical system 6-100 of the present disclosure has its own housing, and the adjacent housings are not in contact with each other.

Figure 4:
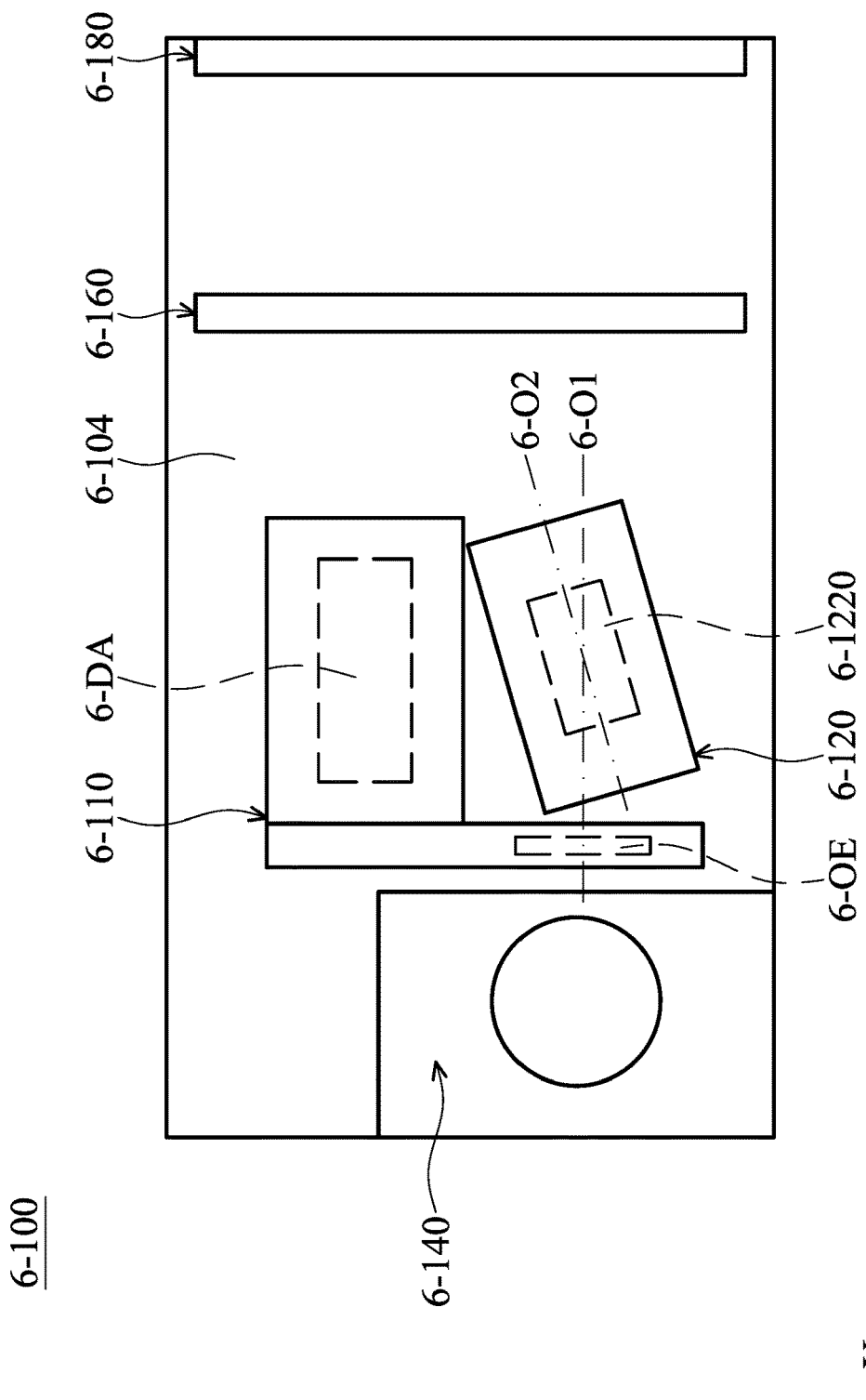
FIG. 4 is a top view of the optical system 6-100 according to an embodiment of the present disclosure.

Please refer to FIG. 3 and FIG. 4. FIG. 4 is a top view of the optical system 6-100 according to an embodiment of the present disclosure. A first optical element (an optical element 6-OE) of the first optical module 6-110 has a first optical axis 6-O1, and a second optical element (a lens 6-1220) of the second optical module 6-120 has a second optical axis 6-O2, and the first optical module 6-110 and the second optical module 6-120 are configured to be adjusted so that the first optical axis 6-O1 is aligned to the second optical axis 6-O2 before the adhesive member 6-AD is solidified.

For example, as shown in FIG. 4, when the first optical module 6-110 and the second optical module 6-120 are mounted on the fixed member 6-104 by using the adhesive members 6-AD, the second optical axis 6-O2 may be not aligned with the first optical axis 6-O1 due to the assembly tolerance. At this time, the operator can rotate the second optical module 6-120 so that the second optical axis 6-O2 is aligned with the first optical axis 6-O1, and then solidify the adhesive members 6-AD for securely fixing the first optical module 6-110 and the second optical module 6-120 on the fixed member 6-104.

In an embodiment of the present disclosure, the adhesive member 6-AD may be an Ultraviolet Rays (UV) glue, but it is not limited thereto, and it may be solidified by ultraviolet irradiation.

It should be noted that, as shown in FIG. 3 and FIG. 4, when viewed in a second direction (the Y-axis) which is perpendicular to the first direction (the X-axis), a driving assembly 6-DA of the first optical module 6-110 partially overlaps at least one portion of a lens 6-1220 (the second optical element) of the second optical module 6-120.

Furthermore, as shown in FIG. 2 to FIG. 4, the optical system 6-100 further includes a fifth optical module 6-150 and a sixth optical module 6-160. The fifth optical module 6-150 may include an aperture, and the sixth optical module 6-160 may include a shutter. The fifth optical module 6-150 is disposed above the reflective optical module 6-140 (FIG. 3), and the sixth optical module 6-160 is disposed between the photosensitive module 6-180 and the second optical module 6-120.

The fifth optical module 6-150 is configured to receive an incident light 6-L in a third direction (the Z-axis), and the incident light 6-L is received by the reflective optical module 6-140 after passing through the fifth optical module 6-150. Then, the reflective optical module 6-140 reflects a reflected light 6-RL. The reflected light 6-RL moves in the first direction, and passes through the first optical module 6-110, the second optical module 6-120, and the sixth optical module 6-160 in order to be received by the photosensitive module 6-180 so as to generate digital images.

Next, a specific structures of the second optical module 6-120 are described below. As shown in FIG. 3, the second optical module 6-120 primarily includes a lens driving mechanism 6-1210 and a lens 6-1220, wherein the lens driving mechanism 6-1210 is used to drive the lens 6-1220 to move. For example, the lens driving mechanism 6-1210 can include a lens holder 6-1211, an outer frame 6-1212, two spring sheets 6-1213, at least one coil 6-1214, and at least one magnetic member 6-1215. The coil 6-1214 and the magnetic member 6-1215 may constitute a second driving component.

The lens 6-1220 (the second optical element) is affixed to the lens holder 6-1211 (the second connecting member). Two spring sheets 6-1213 are connected to the lens holder 6-1211 and the outer frame 6-1212, and respectively disposed on opposite sides of the lens holder 6-1211. Thus, the lens holder 6-1211 can be movably hung in the outer frame 6-1212. The coil 6-1214 and the magnetic member 6-1215 are respectively disposed on the lens holder 6-1211 and the outer frame 6-1212, and correspond to each other. When current flows through the coil 6-1214, an electromagnetic effect is generated between the coil 6-1214 and the magnetic member 6-1215, and the lens holder 6-1211 and the lens 6-1220 disposed thereon can be driven to move relative to the outer frame 6-1212 (the second fixed portion), such as moving along the X-axis. In addition, the second optical module 6-120 can further include a sensing component 6-1216 configured to sense the motion of the lens holder 6-1211 relative to the outer frame 6-1212.

Next, a specific structure of the reflective optical module 6-140 are described below. As shown in FIG. 3, the reflective optical module 6-140 primarily includes an optical member 6-1410, an optical member holder 6-1420, a frame 6-1430, at least one first hinge 6-1450, a first driving module 6-1460, and a position detector 6-1401.

The optical member holder 6-1420 can be pivotally connected to the frame 6-1430 via the first hinge 6-1450. When the optical member holder 6-1420 rotates relative to the frame 6-1430, the optical member 6-1410 disposed thereon also rotates relative to the frame 6-1430. The optical member 6-1410 can be a prism or a reflecting mirror.

The first driving module 6-1460 can include a first electromagnetic driving assembly 6-1461 and a second electromagnetic driving assembly 6-1462, respectively disposed on the frame 6-1430 and the optical member holder 6-1420 and corresponding to each other.

For example, the first electromagnetic driving assembly 6-1461 can include a driving coil, and the second electromagnetic driving assembly 6-1462 can include a magnet. When a current flows through the driving coil (the first electromagnetic driving assembly 6-1461), an electromagnetic effect is generated between the driving coil and the magnet. Thus, the optical member holder 6-1420 and the optical member 6-1410 can be driven to rotate relative to the frame 6-1430 around the first hinge 6-1450, so as to adjust the position of the reflected light 6-RL on the photosensitive module 6-180.

The position detector 6-1401 can be disposed on the frame 6-1430 and correspond to the second electromagnetic driving assembly 6-1462, so as to detect the position of the second electromagnetic driving assembly 6-1462 to obtain the rotation angle of the optical member 6-1410. For example, the position detector 6-1401 can be Hall sensors, magnetoresistance effect sensors (MR sensor), giant magnetoresistance effect sensors (GMR sensor), tunneling magnetoresistance effect sensors (TMR sensor), or fluxgate sensors.

Figure 5:
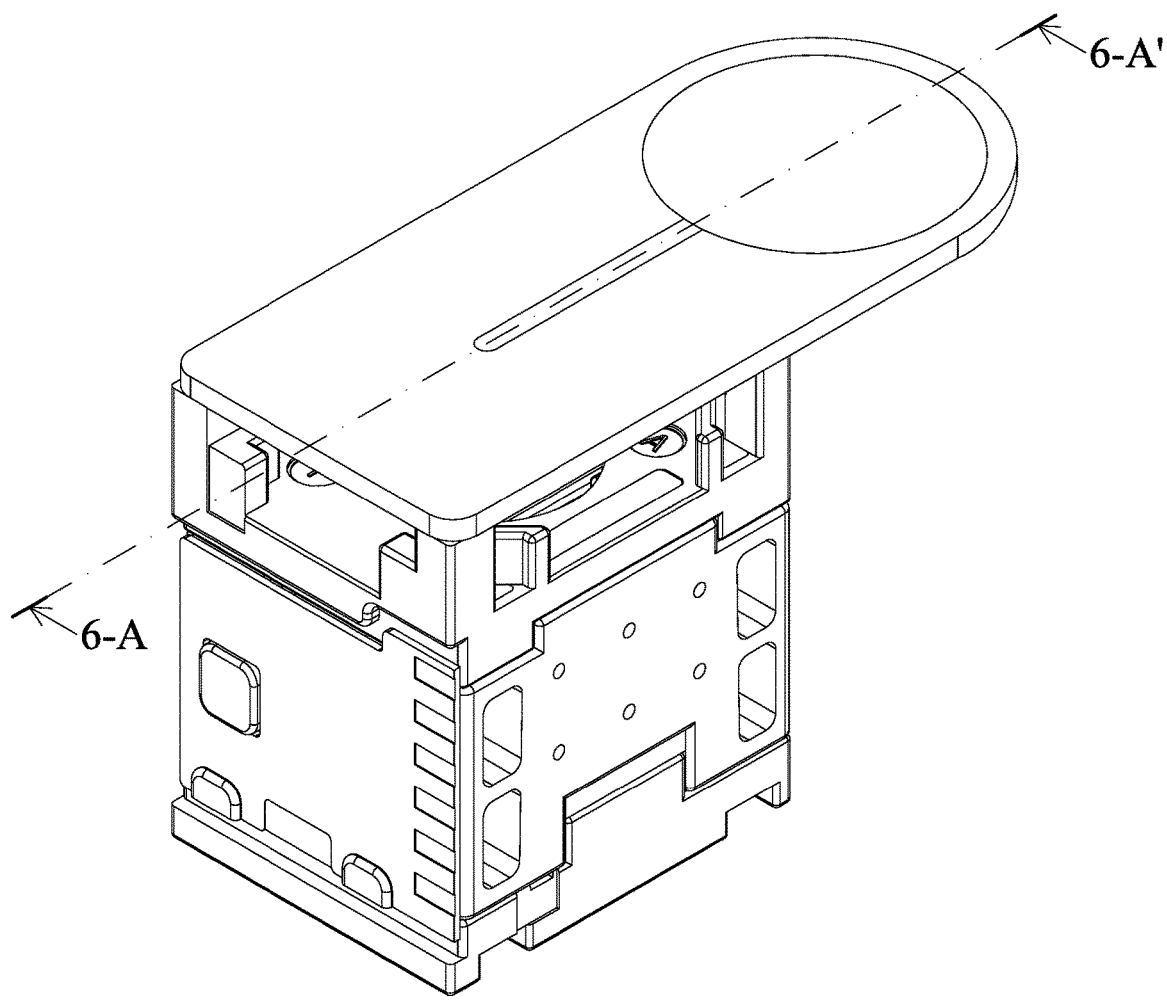
FIG. 5 is a schematic diagram of the first optical module 6-110 according to an embodiment of the present disclosure.
Figure 6:
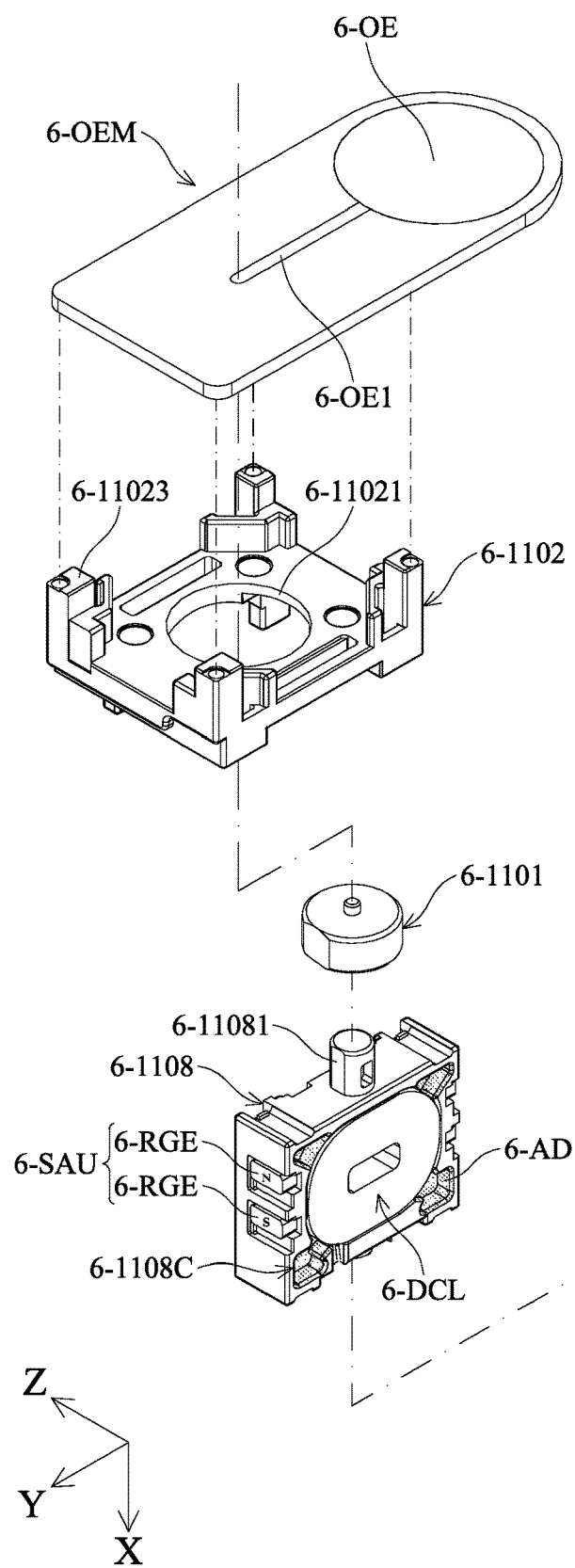
FIG. 6 is an exploded diagram of the first optical module 6-110 according to an embodiment of the present disclosure.
Figure 6:
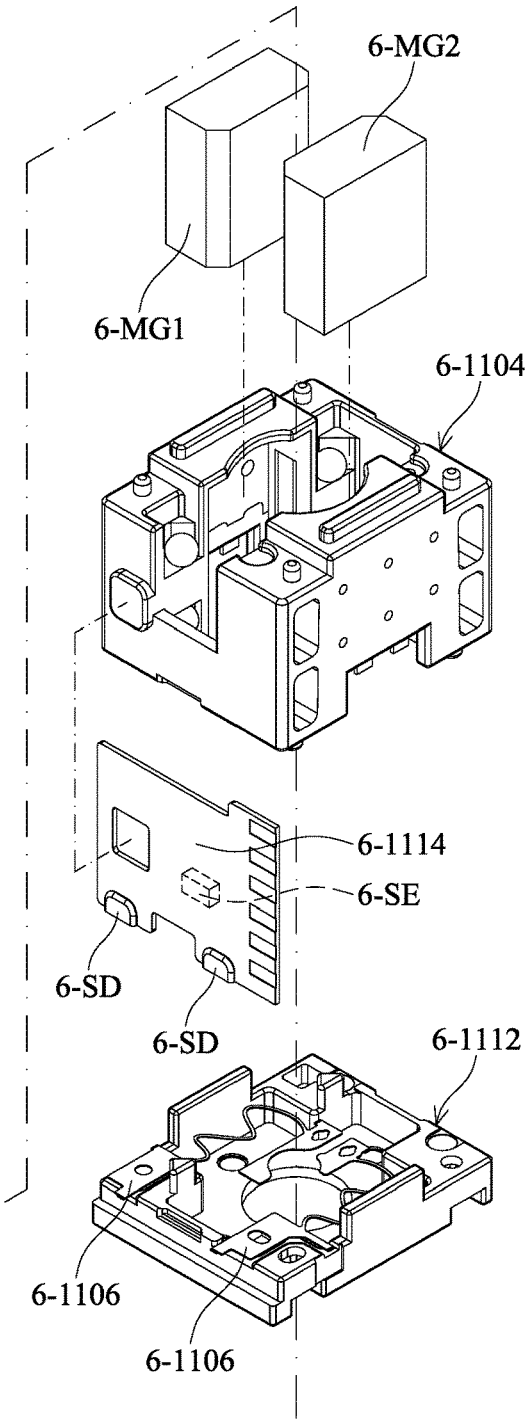
Figure 7:
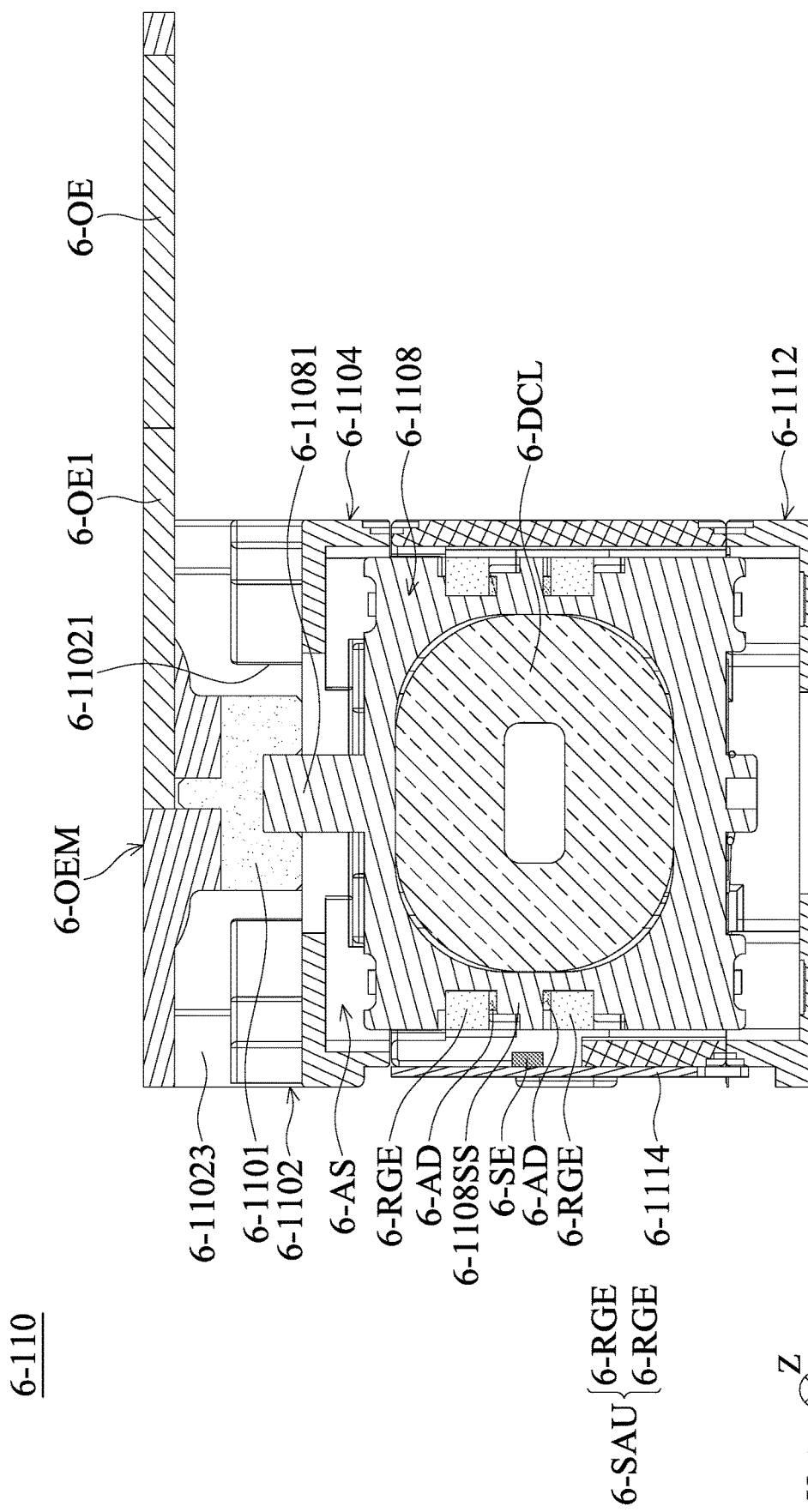
FIG. 7 is a cross-sectional diagram of the first optical module 6-110 along line 6-A-6-A' in FIG. 5 according to an embodiment of the present disclosure.

Next, the structure of the first optical module 6-110 are described. Please refer to FIG. 5 to FIG. 7. FIG. 5 is a schematic diagram of the first optical module 6-110 according to an embodiment of the present disclosure, FIG. 6 is an exploded diagram of the first optical module 6-110 according to an embodiment of the present disclosure, and FIG. 7 is a cross-sectional diagram of the first optical module 6-110 along line 6-A-6-A' in FIG. 5 according to an embodiment of the present disclosure. In this embodiment, the first optical module 6-110 includes an optical element module 6-OEM, a fixed assembly 6-FA (the first fixed portion), a movable assembly 6-MA (the first movable assembly), a driving assembly 6-DA (the first driving assembly), and a position sensing assembly 6-SA. The movable assembly 6-MA corresponds to an optical element 6-OE (the first optical element) of the optical element module 6-OEM, and the movable assembly 6-MA are movable relative to the fixed assembly 6-FA. The driving assembly 6-DA is configured to drive the movable assembly 6-MA to move relative to fixed assembly 6-FA, and the position sensing assembly 6-SA is configured to sense the position and movement of the movable assembly 6-MA relative to fixed assembly 6-FA.

As shown in FIG. 6, the fixed assembly 6-FA may include a top frame 6-1102, a side frame 6-1104, and a base 6-1112. The top frame 6-1102 is fixedly connected to the side frame 6-1104, and the side frame 6-1104 is fixedly connected to the base 6-1112. The top frame 6-1102 has an opening 6-11021 and four protruding columns 6-11023, and the optical element module 6-OEM is fixedly disposed on these protruding columns 6-11023. The side frame 6-1104 and the base 6-1112 may form an accommodating space 6-AS (FIG. 7), configured to accommodate the movable assembly 6-MA and the driving assembly 6-DA. In addition, the fixed assembly 6-FA may further include a circuit board 6-1114, which is fixedly disposed on one side of the side frame 6-1104.

The movable assembly 6-MA includes a movable member 6-1108 and two elastic members 6-1106. The movable member 6-1108 is movably disposed in the accommodating space 6-AS, and the elastic member 6-1106 is disposed the side frame 6-1104 and the base 6-1112. In addition, the driving assembly 6-DA may include a driving coil 6-DCL, a first driving magnetic element 6-MG1, and a second driving magnetic element 6-MG2.

As shown in FIG. 6, the driving coil 6-DCL is disposed in the movable member 6-1108. The movable member 6-1108 may have a plurality of grooves 6-1108C located around the driving coil 6-DCL, and an adhesive member 6-AD can be accommodated in each groove 6-1108C, so that the driving coil 6-DCL is fixed in the movable member 6-1108. The first driving magnetic element 6-MG1 and the second driving magnetic element 6-MG2 correspond to the driving coil 6-DCL and are fixedly provided in the fixed assembly 6-FA. Specifically, the first driving magnetic element 6-MG1 and the second driving magnetic element 6-MG2 are disposed on the side frame 6-1104 and are located in the accommodating space 6-AS. In addition, the driving coil 6-DCL is electrically connected to the circuit board 6-1114 via two the elastic members 6-1106. For example, the driving coil 6-DCL is electrically connected to the circuit board 6-1114 by solders 6-SD in FIG. 6.

In this embodiment, the position sensing assembly 6-SA includes a sensed unit 6-SAU and a sensing element 6-SE. The sensing element 6-SE is disposed on the circuit board 6-1114 and corresponds to the sensed unit 6-SAU. The sensed unit 6-SAU may have a plurality of reference magnetic elements 6-RGE. These reference magnetic elements 6-RGE are arranged in a first direction (such as the X-axis), the sensed unit 6-SAU and the sensing element 6-SE are arranged in an arrangement direction (the Y-axis), and the first direction is not parallel to the arrangement direction.

As shown in FIG. 6 and FIG. 7, the optical element 6-OE is a liquid lens, and the optical element 6-OE can has a flow channel 6-OE1. A translucent liquid is disposed in the flow channel 6-OE1 and the optical element 6-OE. Furthermore, the first optical module 6-110 may further include a deforming member 6-1101 (the first connecting member), a protruding pillar 6-11081 of the movable member 6-1108 is inserted into the deforming member 6-1101, and the deforming member 6-1101 is in contact with one end of the flow channel 6-OE1 (such as the left end in FIG. 7).

In this embodiment, one or both sides of the optical element 6-OE and the flow channel 6-OE1 along the X-axis may be a thin film structure. When the driving coil 6-DCL is provided with electricity, the driving coil 6-DCL acts with the first driving magnetic element 6-MG41 and the second driving magnetic element 6-MG2 to generate an electromagnetic driving force. This electromagnetic driving force drives the movable member 6-1108 to move along the X-axis. Therefore, the movable member 6-1108 and the deforming member 6-1101 push the flow channel 6-OE1 so that a portion of the liquid in the flow channel 6-OE1 flows to the optical element 6-OE, thereby causing the optical element 6-OE to deform. Thus, the optical properties of the optical element 6-OE are changed so as to achieve the effect of optical zoom.

As shown in FIG. 7, a separating structure 6-1108SS (a spacer element) can be formed on the movable member 6-1108, and the separating structure 6-1108SS is disposed between these reference magnetic elements 6-RGE. When viewed in the first direction (the X-axis), the reference magnetic elements 6-RGE partially overlap the separating structure 6-1108SS, and the separating structure 6-1108SS has a non-magnetic permeability material, such as a plastic material. Furthermore, the first optical module 6-110 may include a plurality of adhesive members 6-AD disposed between the separating structure 6-108SS and the corresponding reference magnetic element 6-RGE, so that the reference magnetic elements 6-RGE are fixed to the movable member 6-108.

Figure 8:
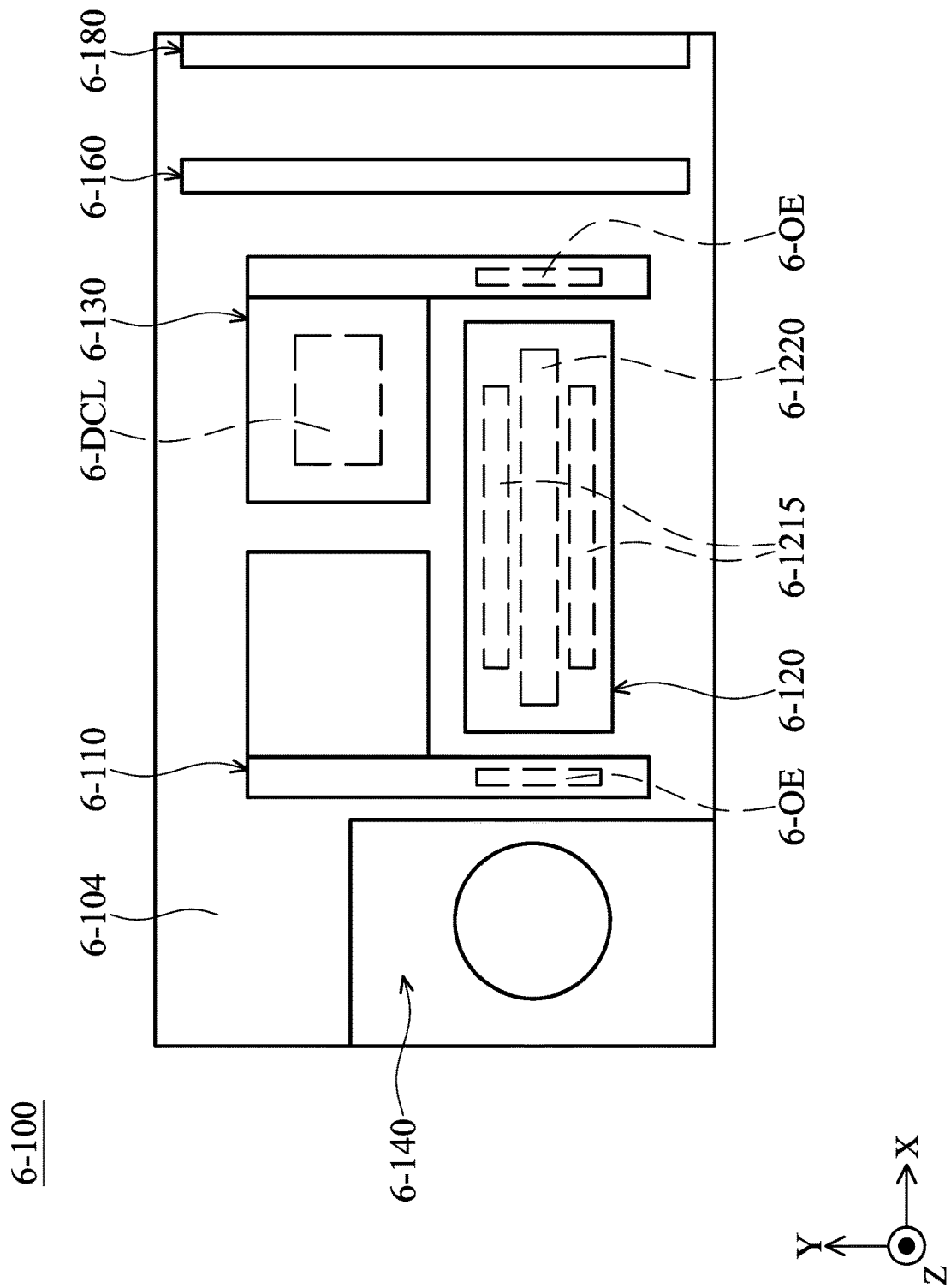
FIG. 8 is a top view of the optical system 6-100 according to another embodiment of the present disclosure.

Please refer to FIG. 8, which is a top view of the optical system 6-100 according to another embodiment of the present disclosure. In this embodiment, the optical system 6-100 may further include a third optical module 6-130, and the third optical module 6-130 may have the same structure as the first optical module 6-110. For example, the third optical module 6-130 includes a third driving assembly (such as the driving assembly 6-DA), a third fixed portion (such as the fixed assembly 6-FA), and a third connecting member (such as the deforming member 6-1101).

When viewed in the first direction (the X-axis), the magnetic member 6-1215 of the second driving assembly partially overlaps at least one portion of a third optical element (such as the optical element 6-OE) of the third optical module 6-130. When viewed in the second direction (the Y-axis), the driving coil 6-DCL of the third driving assembly of the third optical module 6-130 partially overlaps the lens 6-1220 (the second optical element).

It should be noted that the optical element 6-OE (the first optical element) of the first optical module 6-110 and the optical element 6-OE (the third optical element) of the third optical module 6-130 are located on opposite sides of the magnetic member 6-1215 of the second driving assembly. Based on the above design, the second optical module 6-120 can be configured with a longer lens 6-1220, so that the optical system 6-100 can perform a better photographing effect.

In addition, the first optical module 6-110 to the reflective optical module 6-140 of the present disclosure are arranged in the first direction (the X-axis), and they are not stacked in a third direction (the Z-axis). The third direction is perpendicular to the first direction (the X-axis) and the second direction (the Y-axis).

An optical system is provided in the present disclosure and includes a plurality of modules, which are disposed in the housing 6-102 and can be fixed on the fixed member 6-104. These modules can include the liquid lens module, the reflective optical module, the aperture, or the photosensitive module. The configuration of these modules on the fixed member 6-104 can be adjusted according to different design requirements so as to achieve better performance of the optical system.

In addition, the first optical module 6-110 to the reflective optical module 6-140 in these modules are not stacked along the Z-axis, so that the optical system of the present disclosure can achieve the purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a first optical module, including a first connecting member for connecting a first optical element;
   a second optical module, including a second connecting member for connecting a second optical element; and
   a fixed member,
   wherein the first optical module and the second optical module are arranged in a first direction,
   wherein the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member,
   wherein the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction,
   wherein the first optical module and the second optical module are fixedly disposed on the fixed member, and
   wherein the fixed member is different from the first fixed portion of the first optical module.

2. The optical system as claimed in claim 1, wherein the first driving assembly is configured to drive the first connecting member to move relative to the first fixed portion, and when viewed in a second direction perpendicular to the first direction, the first driving assembly partially overlaps at least one portion of the second optical element.

3. The optical system as claimed in claim 2, wherein the optical system further includes a third optical module, and the second optical module further includes a second driving assembly configured to drive the second connecting member to move relative to a second fixed portion of the second optical module, wherein when viewed in the first direction, the second driving assembly partially overlaps at least one portion of a third optical element of the third optical module.

4. The optical system as claimed in claim 3, wherein the third optical module further includes a third driving assembly, a third fixed portion and a third connecting member, the third connecting member is connected to the third optical element, and the third driving assembly is configured to drive the third connecting member to move relative to the third fixed portion, wherein when viewed in the second direction, the third driving assembly partially overlaps the second optical element.

5. The optical system as claimed in claim 4, wherein the first optical element and the third optical element are located on opposite sides of the second driving assembly.

6. The optical system as claimed in claim 3, wherein the optical system further includes a fourth optical module, the fourth optical module includes a reflecting mirror, and the first optical module is disposed between the fourth optical module and the second optical module.

7. The optical system as claimed in claim 6, wherein the first to the fourth optical modules are not stacked in a third direction, and the third direction is perpendicular to the first direction and the second direction.

8. The optical system as claimed in claim 6, wherein the optical system further includes a fifth optical module, configured to receive an incident light in a third direction, the incident light is received by the fourth optical module after passing through the fifth optical module, the fourth optical module reflects a reflected light, and the reflected light moves in the first direction.

9. The optical system as claimed in claim 8, wherein the optical system further includes a photosensitive module and a sixth optical module, and the sixth optical module is disposed between the photosensitive module and the second optical module.

10. The optical system as claimed in claim 2, wherein the first optical module has a first housing, the second optical module has a second housing, the first housing has a first wall surface, the second housing has a second wall surface, and the first wall surface faces the second wall surface.

11. The optical system as claimed in claim 10, wherein there is a gap formed between the first wall surface and the second wall surface.

12. The optical system as claimed in claim 10, wherein a gap is formed between the fixed member and the first optical module, and another gap is formed between the fixed member and the second optical module.

13. The optical system as claimed in claim 12, wherein the optical system further includes two adhesive members for filling the gaps.

14. The optical system as claimed in claim 13, wherein the first optical module has a first optical axis, the second optical element has a second optical axis, and the first optical module and the second optical module are configured to be adjusted so that the first optical axis is aligned to the second optical axis before the adhesive member is solidified.

15. The optical system as claimed in claim 1, wherein a spacer element is disposed between the reference magnetic elements, and when viewed in the first direction, the reference magnetic elements partially overlap the spacer element, and the spacer element has a non-magnetic permeability material.

16. The optical system as claimed in claim 15, wherein the first optical module further includes a plurality of adhesive members disposed between the spacer element and the reference magnetic elements.

17. The optical system as claimed in claim 1, wherein the first driving assembly further includes a driving magnetic element and a driving coil, a plurality of grooves are located around the driving coil, and an adhesive member is accommodated in each of the grooves.

18. An optical system, comprising:
a first optical module, including a first connecting member for connecting a first optical element; and
a second optical module, including a second connecting member for connecting a second optical element,
wherein the first optical module and the second optical module are arranged in a first direction,
wherein the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member,
wherein the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction,
wherein the first driving assembly is configured to drive the first connecting member to move relative to the first fixed portion, and when viewed in a second direction perpendicular to the first direction, the first driving assembly partially overlaps at least one portion of the second optical element,
wherein the optical system further includes a third optical module, and the second optical module further includes a second driving assembly configured to drive the second connecting member to move relative to a second fixed portion of the second optical module, wherein when viewed in the first direction, the second driving assembly partially overlaps at least one portion of a third optical element of the third optical module, and
wherein the third optical module further includes a third driving assembly, a third fixed portion and a third connecting member, the third connecting member is connected to the third optical element, and the third driving assembly is configured to drive the third connecting member to move relative to the third fixed portion, wherein when viewed in the second direction, the third driving assembly partially overlaps the second optical element.

19. An optical system, comprising:
a first optical module, including a first connecting member for connecting a first optical element; and
a second optical module, including a second connecting member for connecting a second optical element,
wherein the first optical module and the second optical module are arranged in a first direction,
wherein the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member,
wherein the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction,
wherein the first driving assembly is configured to drive the first connecting member to move relative to the first fixed portion, and when viewed in a second direction perpendicular to the first direction, the first driving assembly partially overlaps at least one portion of the second optical element,
wherein the optical system further includes a third optical module, and the second optical module further includes a second driving assembly configured to drive the second connecting member to move relative to a second fixed portion of the second optical module, wherein when viewed in the first direction, the second driving assembly partially overlaps at least one portion of a third optical element of the third optical module, and wherein the optical system further includes a fourth optical module, the fourth optical module includes a reflecting mirror, and the first optical module is disposed between the fourth optical module and the second optical module.

20. An optical system, comprising:

a first optical module, including a first connecting member for connecting a first optical element; and a second optical module, including a second connecting member for connecting a second optical element, wherein the first optical module and the second optical module are arranged in a first direction, wherein the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member, wherein the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction, and wherein a spacer element is disposed between the reference magnetic elements, and when viewed in the first direction, the reference magnetic elements partially overlap the spacer element, and the spacer element has a non-magnetic permeability material.

21. An optical system, comprising:

a first optical module, including a first connecting member for connecting a first optical element; and a second optical module, including a second connecting member for connecting a second optical element, wherein the first optical module and the second optical module are arranged in a first direction, wherein the first optical module further includes a first driving assembly, a first movable assembly and a first fixed portion, and the first driving assembly is configured to drive the first movable assembly to move relative to the first fixed portion, so that the first movable assembly is in contact with the first optical element via the first connecting member, and wherein the first optical module further includes a position sensing assembly configured to sense movement of the first movable assembly relative to the first fixed portion, and the position sensing assembly includes a sensed unit and a sensing element, the sensing element corresponds to the sensed unit, wherein the sensed unit has a plurality of reference magnetic elements arranged in the first direction, the sensed unit and the sensing element are arranged in an arrangement direction, and the first direction is not parallel to the arrangement direction, and wherein the first driving assembly further includes a driving magnetic element and a driving coil, a plurality of grooves are located around the driving coil, and an adhesive member is accommodated in each of the grooves.

* * * * *